Figure 1:
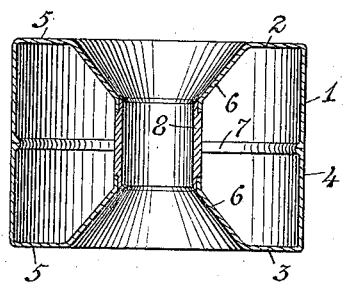

P. MORI.
FLOAT AND METHOD OF MAKING THE SAME.
APPLICATION FILED APR. 26, 1916.

1,299,851.

Patented Apr. 8, 1919.

WITNESSES
G. V. Rasmussen
Elmer Stoill Young

INVENTOR
PLACIDO MORI
BY Briesen & Schrenk
ATTORNEYS

UNITED STATES PATENT OFFICE.

PLACIDO MORI, OF NEW YORK, N. Y.

FLOAT AND METHOD OF MAKING THE SAME.

1,299,851.      Specification of Letters Patent.      Patented Apr. 8, 1919.

Application filed April 26, 1916. Serial No. 93,604.

*To all whom it may concern:*

Be it known that I, PLACIDO MORI, a citizen of the United States, residing at Arrochar, Richmond county, city and State of New York, have invented certain new and useful Improvements in Floats and Methods of Making the Same, of which the following is a specification.

My invention relates to floats and particularly to floats such as are used in carbureters and the like to control the consumption and flow of gasolene or other motive fluids; and to such floats as are used in plumbing and steam practice to control or indicate water levels and the like.

My invention has for its object to provide an improved hollow metal float which can be quickly, cheaply and economically made, which can have any desired form, and which can be given great strength and rigidity although containing but a small amount of metal. A further object of my invention is to provide a float of the character described which shall be absolutely fluid tight and remain so indefinitely. A still further object of my invention is to provide a float of the character described which can be made in quantity accurately true to size and weight and which will not require individual adjustment in respect to either of these characteristics.

In the prior art it has been common to make floats of cork, particularly those floats intended to be used in carbureters and the like, these floats being coated with varnish or some equivalent material for the purpose of closing their pores and thereby preventing absorption of moisture or other fluids. Such floats, besides being fragile, have been defective in the respect that any injury to the protecting varnish would permit the ingress of moisture or fluid, thus changing the weight of the float and the accuracy of its control. Aside from injury, it has been practically impossible to find any varnish or equivalent coating which would last for any great length of time in the presence of gasolene or other motive fluids commonly used. To avoid the just noted defects, attempts have been made from time to time to produce all metal hollow floats. Such floats have been largely used in the plumbing and steam engine arts where, owing to the fact that the floats are usually of considerable size, it has been possible to secure fairly satisfactory results by making the floats sectionally of pressed copper or brass *e. g.*, and soldering or welding the joints together.

Sectionally formed floats, as above described, for carbureters and the like have been generally unsatisfactory, first, because of the considerable weight of metal required, second, because of the difficulty of making the floats quickly and yet having them come out accurately to the same weight, and third, because of the ease with which defective welded or soldered joints would slip past the workman making the joints.

Numerous attempts have been made to produce floats electrolytically by depositing copper upon a suitably prepared wax core, then applying heat so as to melt out the wax and finally closing the opening through which the wax has issued. This method has produced floats which have been fairly satisfactory although obviously their production is costly owing to the necessity of making a new core for each successive float. The expense of individually soldering up the wax exit openings of the floats is also substantial. A further difficulty has been that it is practically impossible to completely melt out the wax of each core or to melt it out to exactly the same degree so as to bring it about that each and every finished float will have exactly the same weight.

All of the above disadvantages are avoided by the float of my invention. Briefly described my invention resides in first providing a hollow core of thin sheet celluloid or the like formed in suitable machine dies so as to have accurately the shape of the required float. The core is then covered with a suitable conducting material, preferably by spraying or dipping into a suitable metallic paint, and then drying. It is finally placed in a suitable electrolytic bath, preferably of copper, and a coating of any desired thickness deposited thereupon in the usual way. By a suitable regulation of the current density and of the time during which electrolysis goes on, and of other conditions, which, of course, will vary with the size and type of float, it is possible in this way to produce floats which, when taken from the bath and dried, will have a predetermined weight to a very high degree of accuracy. By carrying out the method on a large scale and using a suitable bath, so that a great many cores may be deposited upon at the same time, it is possible to make floats in this way very cheaply and economically.

Figure 2:
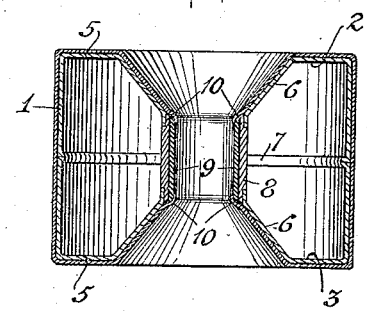
Figure 3:
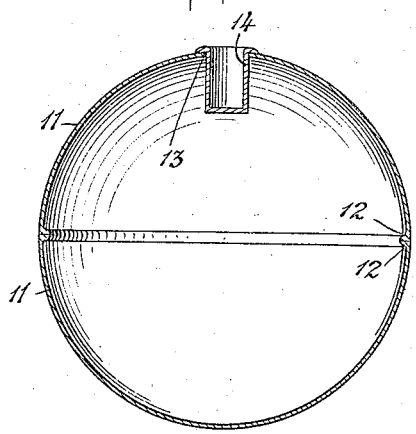
Figure 4:
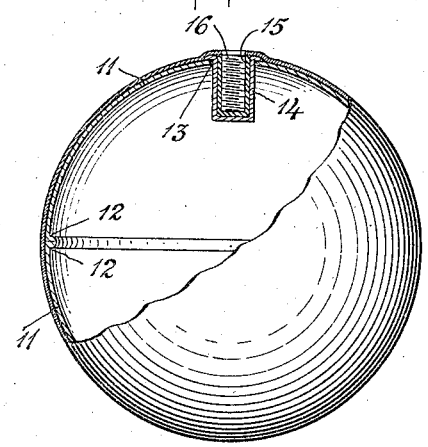

My invention will be better understood by referring to the accompanying drawings in which Figures 1 and 2 show the float of a well known carbureter made according to my invention, Fig. 1 being a meridian section through the celluloid core and Fig. 2 being a similar section through the completed float. Figs. 3 and 4 show a usual type of spherical float made according to my invention, Fig. 3 being a meridian section through the celluloid core, and Fig. 4 being a similar view, part elevation, through the completed float, both sections being taken so as to show the attaching plug by means of which the float is connected to the apparatus with which it is to be associated.

In the drawings, Figs. 1 and 2, the celluloid core 1 is preferably made in two similar halves 2, 3, thus requiring but one set of dies. In this case each half consists of the outer tubular portion 4, annular portion 5 and conical portion 6, these several parts making up one integral whole. The open end of each half is fitted against the corresponding open end of the other half box fashion and the seam 7 suitably cemented or otherwise made firm, fluid tight and permanent. The manner of doing this forms no part of my invention being well known in the art of making celluloid articles.

A celluloid tube 8, the ends of which are suitably shaped, is inserted in the center of the box so as to fit the smaller ends of the cones 6. These ends may also be cemented fast or otherwise made permanently fluid tight.

There is thus formed a tubular box whose end walls are turned conically inward.

The celluloid box which has thus been completely formed and is fluid tight is now sprayed or otherwise covered with a suitable metallic paint and allowed to dry. It is then, in the usual way, placed in a suitable electrolytic bath, preferably of copper, and a coating of any desired thickness laid thereupon. After plating the float is removed from the bath, and washed and dried in the usual way.

If the diameter of the central tube 8 is not too small, the copper plating will enter the opening and deposit satisfactorily upon the inner surface of the tube. If, however, the diameter of the tube is too small in proportion to its length to bring about a substantial and uniform deposit, then a thin copper tube 9 may be inserted and its ends 10 turned over outwardly upon the conical portions 6. This will assist in mechanically holding the copper tube 9 in place and the plating, as it progresses, will cover the juncture of ends 10 and the celluloid so as to practically make the tube 9 part of the uniform coating of plate. After the plating is entirely completed any contraction of the diameter of the tube 9 at the ends 10 may be removed by applying a suitable burnishing tool.

The float shown in Figs. 3 and 4 is of a type which is made in many sizes and applied to many uses. Whether large or small, I find no difficulty in making it according to my invention. As described for Figs. 1 and 2, the two halves 11, 11, are formed in suitable dies, the open ends 12 being then fitted and permanently joined together. A hole 13 is formed preferably at the pole of one of the halves. A celluloid tube 14, closed at one end and with its open end flared outwardly, is then seated in hole 13 and cemented or otherwise permanently fastened in place so as to make the entire ball fluid tight.

The ball is then electrolytically covered with a suitable thickness of copper as previously described for the float of Figs. 1 and 2.

If the internal diameter of tube 14 is too small in proportion to its depth then a suitable bottomed copper tube 15 is inserted in tube 14 as a liner and its outer ends flared or spun over upon the flared end of the celluloid tube 14. The electrolytic deposit will cover and unite with the spun or flared end of the copper so that deposit and copper tube 15 will be integrally united.

A screw thread 16 may be formed in tube 15 for the purpose of attaching the completed float to the apparatus with which it is to function.

Although I prefer celluloid for a core, any other suitable material, which will be impervious to the electrolytic bath, and is capable of being suitably shaped, may be substituted therefor. Thus papier mâché, bakelite, vulcanized fiber and the like will serve. Such material must be capable of being easily shaped with thin walls; furthermore, these materials should be tough so as not to fracture easily and should be unaffected by heat under temperature conditions such as obtain in close proximity to internal combustion engines.

When in the claim I speak of celluloid I intend to include all equivalents thereof where used in the same relation. These substitute materials must, of course, be suitably prepared.

Besides the advantages already enumerated, my improved float has the added advantage that, should a leak develop in the metal coating, it would still be impossible for liquid to enter the float since the celluloid or other core is itself fluid tight, Having described my invention, I claim:—

1. The method of making hollow metal floats which comprises providing a fluid tight hollow core of thin non-metallic material, covering selected parts of said core with shaped metallic pieces and finally depositing electrolytically a coating of metal upon the surface of the float, as and for the purpose described.

2. The method of making hollow metal floats which comprises providing a fluid tight hollow core of thin celluloid, covering selected parts of said core with shaped pieces of copper and finally depositing electrolytically a coating of copper upon the surface of the float, as and for the purpose described.

In testimony whereof I have hereunto set my hand.

PLACIDO MORI.

Copies of this patent may be obtained for five cents each, by addressing the "Commissioner of Patents, Washington, D. C."